United States Patent [19]

Schneider et al.

[11] 4,053,283
[45] Oct. 11, 1977

[54] MIXING DEVICE FOR MIXING TOGETHER MULTI-COMPONENT PLASTICS MATERIALS

[75] Inventors: Fritz W. Schneider; Helmut Clausen; Manfred Kelterbaum, all of Strasslach, Germany

[73] Assignee: Elastogran Maschinenbau GmbH & Co., Strasslach near Munich, Germany

[21] Appl. No.: 701,348

[22] Filed: June 30, 1976

[30] Foreign Application Priority Data

Aug. 29, 1975 Germany .............................. 2538437

[51] Int. Cl.² .............................................. C08J 9/30
[52] U.S. Cl. ................................. 23/252 R; 251/325; 137/625.4; 239/112; 239/117; 260/2.5 BC; 366/179; 261/82
[58] Field of Search .................... 23/252 R; 259/4 R; 251/325; 137/625.4, 625.37, 625.38, 625.35, 625.67, 625.68; 239/106–118; 260/2.5 BC

[56] References Cited

U.S. PATENT DOCUMENTS

| 3,799,199 | 3/1974 | Rumpff .............................. 259/4 R X |
| 3,870,078 | 3/1975 | Art, Jr. et al. ..................... 251/325 X |
| 3,960,506 | 6/1976 | Schmitzer ....................... 23/252 R X |

Primary Examiner—James H. Tayman, Jr.
Attorney, Agent, or Firm—H. Dale Palmatier

[57] ABSTRACT

A mixing device for mixing together multi-component plastics materials, for example polyurethane, comprises a mixing chamber into which supply ducts for the components lead and in which a piston is reciprocable between a retracted position in which the supply ducts are in communication with the mixing chamber and a forward position in which the supply ducts are shut off from the mixing chamber. The piston is provided with an axial bore through it connected to a supply of air under pressure to enable air to be supplied into the mixing chamber together with the components for producing plastic foam such as foamed polyurethane.

4 Claims, 3 Drawing Figures

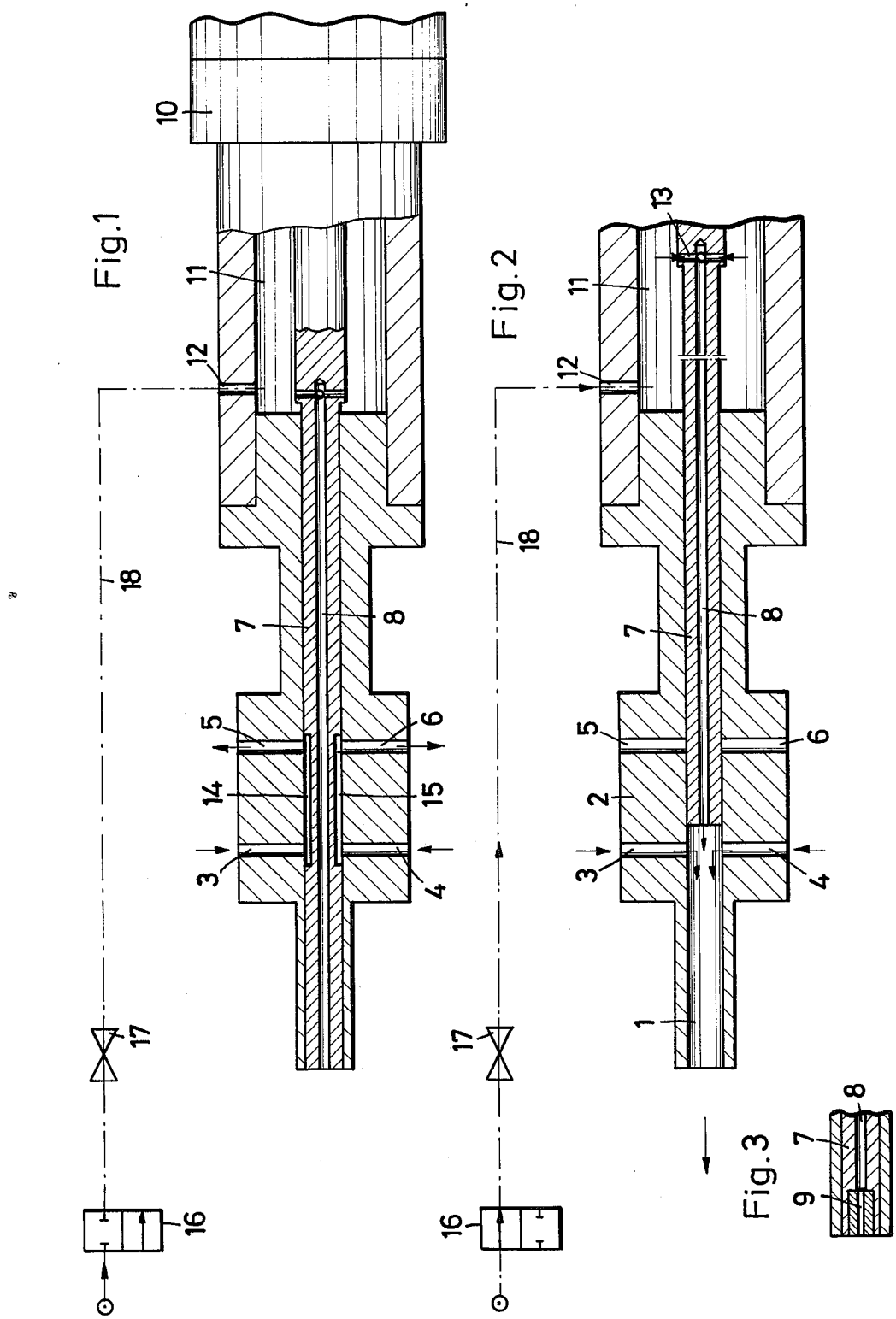

MIXING DEVICE FOR MIXING TOGETHER MULTI-COMPONENT PLASTICS MATERIALS

This invention relates to mixing devices for mixing together multi-component plastics materials, for example polyurethane, comprising a mixing chamber, into which supply ducts for the components lead and in which a piston is reciprocable to control the flows of the components through the ducts.

One such mixing device is equipped with a piston, which both regulates the inflow of the components and optionally also the outflow of the mixed material, and also mechanically cleans the mixing chamber at the end of a mixing operation. Such a device is disclosed in German Specification No. 2,007,935.

It has also already been proposed, in somewhat different mixing devices, to introduce air into the mixing chamber in order to influence the cell structure of polyurethane foam produced by the device. In this form of device, the air inlet openings very easily become blocked and moreover the control of the air supply as a function of the feed rate of the components is difficult.

It is furthermore known, in semi-hard polyurethane foam making machines used in the automobile industry, that mixing devices comprising mixing chambers with mechanical agitators and an air feed may be used for producing differing pore structures, in order that these foamed materials can be rapidly compressed when subjected to pressure but then only slowly re-adopt their initial form after release of the pressure.

The aim of the present invention is to provide a mixing device of the type initially described, wherein an air feed is possible with only the very least possible constructional complication and with high functional reliability.

To this end, according to this invention, in a mixing device for mixing together multi-component plastics materials, the device comprising a mixing chamber into which supply ducts for the components lead and in which a piston is reciprocable to control the flows of the components, the piston is provided with a passage for the supply of air into the mixing chamber.

The provision of a passage in the piston constitutes a structurally very elegant and simple solution to the problems which have hitherto occurred. Moreover, the air is introduced at the point where it is desired. An accurate time control of the air supply is also possible in conjunction with the feed of the components. Preferably, for example, the passage has means for controlling the supply of air through it, the ducts have means for controlling the supply of components through them, and means are provided for operating the controlling means to cause air to be supplied to the chamber before the components and the air supply to be interrupted after the component supply has been interrupted.

Experiments have demonstrated that this very type of air feed makes possible the desired effects in a surprising manner. In an advantageous manner, the air supply can still be maintained through the piston after the component inlets have been shut off, in order to promote the cleaning of the outlet of the mixing chamber and especially of the end face of the piston.

Furthermore, it is possible when the passage is an axial bore through the piston, in order to influence the air flow, to provide a nozzle in the end of the bore leading into the mixing chamber. This nozzle may be replaceable, to enable nozzles of other shapes to be used.

In is also of advantage to provide, in a line for feeding the air to the passage in the piston, a regulating valve by which the air flow can be modified in its intensity.

An example of a mixing device in accordance with the invention is illustrated somewhat diagrammatically in the accompanying drawings, in which:

FIG. 1 is a longitudinal section through the mixing device with its parts in a position in which mixing is not taking place, but the components to be mixed are being recirculated;

FIG. 2 is a section corresponding to FIG. 1, but with the parts in a position in which mixing and air feed are taking place; and, FIG. 3 is a sectional detail of the forward end of the piston of the device.

The mixing device shown in the drawings has a mixing chamber 1, in which a piston 7 is reciprocably movable. The mixing chamber 1 is connected to a housing 2 containing component supply and outlet ducts. Two supply ducts 3 and 4 lead into the housing 2 and into the mixing chamber 1 and two return ducts 5 and 6 lead out of the housing 2.

With the parts in the positions shown in FIG. 1, the supply duct 3 is connected via a groove 14 with the return duct 5, and the supply duct 4 is connected via a groove 15 with the return duct 6. In this position, no entry of the components into the mixing chamber takes place, but the components are recirculated to storage tanks.

In the piston 7, there is a bore 8, which is in communication via openings 13 with an air chamber 11. The air chamber 11 is supplied with air via an opening 12, to which an air line 18 leads from a compressed air source. A valve 16 opens and shuts off the air supply, and a control valve 17 regulates the air flow in the air line 18.

The piston 7 is reciprocated by a hydraulic piston 10.

At that end of the bore 8 which leads into the mixing chamber 1, there is a replaceable nozzle 9 as shown in FIG. 3.

With the parts in the positions shown in FIG. 2, which is the mixing position, the components flow throgh the supply ducts 3 and 4 into the mixing chamber 1. The air flow issuing from the bore 8 acts upon the mixture and ensures that the desired cell structure is produced. This may advantageously be a cell structure having cells of different sizes.

When the mixing device is brought from the position shown in FIG. 1 to that shown in FIG. 2, the piston 7 is withdrawn. Before the components can enter the mixing chamber through the ducts 3 and 4, the valve 16 is opened, so that air flows through the bore 8 into the mixing chamber. When the components then enter the mixing chamber, they already meet the air flow present there. When mixing is terminated, the piston 7 is moved again to the position shown in FIG. 1 in order to connect the ducts 3 and 4 with the corresponding return ducts 5 and 6 via the grooves 14 and 15. Not until the component flow into the mixing chamber has been interrupted, is the air flow at the valve 16 likewise interrupted. By this form of control it is ensured that the inlet opening for the air flow does not become clogged and that in any case an air flow is present for as long as mixing takes place in the mixing chamber.

The nozzle 9 can also be so constructed that the air flow is divided upon leaving the piston, in order, for example, to ensure more uniform air distribution when the piston is of fairly large cross-section.

As an alternative the passage for the air feed may be constructed as a groove or even as two grooves in the piston. The choice of a bore, or a single groove or a number of grooves will depend upon various conditions, for example possible methods of manufacture, and specified dimensions.

We claim:

1. In a mixing device for mixing together multi-component plastics materials and air to influence the cell structure of the resulting mixed plastics, said device comprising a housing defining a mixing chamber, means defining supply ducts communicating with said chamber for the supply of said components to said chamber, a piston reciprocably mounted in said chamber and means for reciprocating said piston between a first position in which said supply ducts are shut off from said chamber and a second position in which said supply ducts are communicated with said chamber, the improvement comprising means defining an air supply passage extending axially along said piston in continuous communication with said chamber and means for connecting said passage to a supply of air under pressure to enable said air under pressure to be supplied together with said components into said mixing chamber.

2. A mixing device as claimed in claim 1, wherein said means for connecting said passage to said supply of air under pressure includes means for controlling said supply of air through said passage, said device further comprising means for controlling said supply of components through said ducts and means for operating said controlling means to cause air to be supplied to said chamber before said components are supplied to said chamber and causing said air supply to said chamber to be interrupted after said supply of said components through said ducts has been interrupted.

3. A mixing device as claimed in claim 1, wherein said passage is an axial bore through said piston and said device further comprises interchangeable nozzle means at the end of said bore leading into said chamber.

4. A mixing device as claimed in claim 1, wherein said means for connecting said passage to said supply of air under pressure includes air flow regulating valve means.

* * * * *